United States Patent [19]

Shimizu et al.

[11] Patent Number: 5,616,660
[45] Date of Patent: Apr. 1, 1997

[54] POLYMERIZATION OF ETHYLENIC MONOMER WITH SCALE PREVENTIVE AGENT

[75] Inventors: Toshihide Shimizu, Urayasu; Mikio Watanabe; Toshihiko Nakano, both of Kamisu-machi, all of Japan

[73] Assignee: Shin-Etsu Chemical Co., Ltd., Tokyo, Japan

[21] Appl. No.: 672,371

[22] Filed: Jun. 25, 1996

Related U.S. Application Data

[62] Division of Ser. No. 321,467, Oct. 11, 1994, Pat. No. 5,576,370, which is a continuation of Ser. No. 149,948, Nov. 10, 1993, abandoned.

[30] Foreign Application Priority Data

Nov. 10, 1992 [JP] Japan ............................ 4-324887

[51] Int. Cl.$^6$ .................................... C08F 2/24; C08F 2/20
[52] U.S. Cl. ..................................... 526/62; 526/344.2
[58] Field of Search ............................................ 526/62

[56] References Cited

U.S. PATENT DOCUMENTS 5,548,039  8/1996  Shimizu ................................... 526/62

Primary Examiner—Christopher Henderson
Attorney, Agent, or Firm—Oblon, Spivak, McClelland, Maier & Neustadt, P.C.

[57] ABSTRACT

A polymer scale preventive agent for use in polymerization of a monomer having an ethylenically unsaturated double bond, comprising an alkaline solution containing (A) a condensation product of (A-1) a hydroxynaphthalene compound and (A-2) an aldehyde compound, and (B) an inorganic colloid. This agent is used for forming a coating on the inner wall, etc. of a polymerization vessel. Such a vessel is effective in preventing polymer scale deposition, not only in the liquid-phase region but also in the vicinity of the interface between the gas and liquid phases in the vessel, and useful in producing a polymer that shows very few fish eyes and good whiteness when formed into sheets or the like.

8 Claims, No Drawings

POLYMERIZATION OF ETHYLENIC MONOMER WITH SCALE PREVENTIVE AGENT

This is a Division of application Ser. No. 08/321,467 filed on Oct. 11, 1994, now U.S. Pat. No. 5,576,370 which is a Continuation of Ser. No. 08/149,948, filed Nov. 10, 1993 (abandoned).

BACKGROUND OF THE INVENTION

1. Field of the Invention

The present invention relates to a polymer scale preventive agent for use in polymerization of a monomer having an ethylenically unsaturated double bond, a polymerization vessel effective in preventing polymer scale deposition, and a process for producing a polymer using the same.

2. Description of the Prior Art

Heretofore, methods for polymerization of a monomer having an ethylenically unsaturated double bond have been known, such as suspension, emulsion, solution, gas phase and bulk polymerization processes and the like. In any of these polymerization processes, polymer scale is liable to be deposited on the areas with which the monomer comes into contact, such as inner walls, stirring equipment and so on of a polymerization vessel.

The deposition of the polymer scale results in disadvantages that the yield of the polymer and cooling capacity of the polymerization vessel are lowered, and that the polymer scale may peel off and mix into a polymeric product, thereby impairing the quality of formed products obtained by processing the polymeric product. In addition, removal of deposited polymer scale is very laborious and time-consuming. Further, the polymer scale contains unreacted monomers and, therefore, may cause physical disorders in the operators, which has been a very serious problem in recent years.

For preventing polymer-scale deposition on the polymerization vessel inner wall and so forth, methods have been known, for example, a method in which a polymer scale preventive agent comprising a polar organic compound such as amine compounds, quinone compounds, aldehyde compounds, etc. is applied to the polymerization vessel inner wall and so on to form a coating and a method in which such compounds are added to an aqueous medium for suspension polymerization (Japanese Patent Publication (KOKOKU) No. 45-30343 (1970)), as practiced in some instances of suspension polymerization of vinyl chloride.

However, these methods have the disadvantage that, although the polymer scale preventive effect is exhibited while polymerization is repeated for up to about 5 or 6 batches, the effect diminishes if the number of repeated batches of polymerization exceeds 5 or 6 (that is, the scale preventive effect is poor in durability). The disadvantage is emphasized particularly where a water-soluble catalyst is used for polymerization, and, in this point, the polymer scale prevention according to these methods is unsatisfactory industrially.

For overcoming the above disadvantage, methods have been proposed in which the inner wall of a polymerization vessel is coated with a polymer scale preventive agent whose effective constituent is, for example, a condensation product of an aromatic amine compound and an aromatic nitro compound (Japanese Patent Publication (KOKOKU) No. 60-30681 (1985)), a reaction product of a phenolic compound with an aromatic aldehyde (Japanese Pre-examination Patent Publication (KOKAI) No. 57-192414 (1982)), a reaction product of a polyhydric phenol with an aliphatic aldehyde (Japanese Patent Publication (KOHYO) No. 57-502169 (1982)), a reaction product of 1-naphthol with formaldehyde (Japanese Patent Publication (KOKOKU) No. 01-31523 (1989)), or the like. Where one of these known polymer scale preventive agents is applied to the areas with which monomers come into contact, such as the inner wall surface of a polymerization vessel, and a coating is thereby formed, it is possible to repeat about 100 to 200 batches of polymerization without causing deposition of polymer scale on the areas located in the liquid-phase region inside the polymerization vessel. Besides, even in the above-mentioned case where a water-soluble catalyst is used, deposition of polymer scale in the liquid-phase region is similarly prevented.

However, even if the coating is formed by use of the polymer scale preventive agent containing such an effective component as the condensation product of an aromatic amine compound and an aromatic nitro compound, etc. as mentioned above, there remains a drawback that polymer scale deposition may occur on the areas near the interface between the liquid phase and the gas phase located at an upper portion of the interior of the polymerization vessel.

Once polymer scale deposition occurs in the vicinity of the interface between the gas and liquid phases, the deposited scale will grow gradually as polymerization runs are repeated, and at last it may peel off to be incorporated into the polymeric product. If the polymeric product with the polymer scale thus mixed therein is processed into formed products such as sheets or the like, the polymer scale causes generation of many fish eyes in the formed products, thereby lowering seriously the quality of the formed products.

Besides, where a polymeric product is processed into formed products such as sheets, etc., the formed products are required to have a high whiteness. That is, when a polymeric product formed into a sheet or the like without any addition of a coloring agent, the resulting formed product is more or less colored and such coloration, called initial coloration, is desired to be as slight as possible. However, the coating formed by using the polymer scale preventive agent containing such an effective component as the condensation product of an aromatic amine compound and an aromatic nitro compound, etc. as above mentioned may mix into a polymeric product through peeling or dissolution, thereby lowering the whiteness, or increasing the initial coloration, of the resulting formed products.

SUMMARY OF THE INVENTION

It is an object of the present invention to provide a polymer scale preventive agent for use in polymerization of a monomer having an ethylenically unsaturated double bond that can prevent effectively the deposition of polymer scale, not only in the liquid-phase region but also in the vicinity of the interface between the gas and liquid phases inside a polymerization vessel, and that makes it possible to produce a polymer having a very small number of fish eyes and slight initial coloration when processed into formed products such as sheets or the like; and a polymerization vessel and a process for producing a polymer which utilize the polymer scale preventive agent.

The present invention provides a polymer scale preventive agent for use in polymerization of a monomer having an ethylenically unsaturated double bond, comprising an alkaline solution containing:

(A) a condensation product of
  (A-1) a hydroxynaphthalene compound, and
  (A-2) an aldehyde compound, and
(B) an inorganic colloid.

Also, the present invention provides a polymerization vessel for polymerizing a monomer having an ethylenically unsaturated double bond, comprising a coating on its inner wall surfaces, wherein said coating has been formed by applying an alkaline solution containing:
(A) a condensation product of
  (A-1) a hydroxynaphthalene compound, and
  (A-2) an aldehyde compound, and
(B) an inorganic colloid,
followed by drying.

Further, the present invention provides a process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline solution containing:
(A) a condensation product of
  (A-1) a hydroxynaphthalene compound, and
  (A-2) an aldehyde compound, and
(B) an inorganic colloid,
followed by drying.

According to the present invention, deposition of polymer scale in a polymerization vessel can be effectively prevented, not only in the liquid-phase region but also in the vicinity of the interface between the gas phase and the liquid phase. Therefore, where polymerization is conducted by applying the present invention, the operation of removing polymer scale need not be performed every run of polymerization and, as a result, productivity is improved.

In addition, the polymeric product obtained by application of the present invention can be formed into sheets or the like which have very few fish eyes. Besides, the formed products are good in regard of initial coloration property. More specifically, such formed products have a luminosity index (L value) in the Hunter's color difference equation described in JIS Z 8730 (1980) of, for example, at least 70 in the case of vinyl chloride polymer, and at least 80 in the case of SBR.

Furthermore, the polymer scale preventive agent according to the present invention can form a coating with the use of a reduced amount of organic solvent, so that there is little fear of organic-solvent inflammation, explosion or the like and there is no problem as to safety in handling, such as toxicity.

DETAILED DESCRIPTION OF PREFERRED EMBODIMENTS (A) Condensation product
(A-1) Hydroxynaphthalene compound The hydroxynaphthalene compound (A-1) includes, for example, a compound having the following general formula (1):

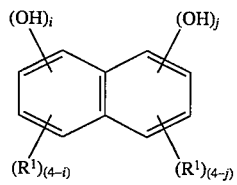

wherein $R^1$ group or groups, which may be the same or different from each other, are each a group selected from the group consisting of —H, —SO$_3$H and —COOH, i is an integer from 1 to 4, and j is an integer from 0 to 4.

Specific examples of the compound of the above general formula (1) include 1-naphthol, 2-naphthol, 1,3-dihydroxynaphthalene, 1,4-dihydroxynaphthalene, 1,7-dihydroxynaphthalene, 2,7-dihydroxynaphthalene, 3,7-dihydroxynaphthalene, 2,6-dihydroxynaphthalene, 1,2,3-trihydroxynaphthalene, 1,4,5,8-tetrahydroxynaphthalene, 1-naphthol-2-sulfonic acid, 1-naphthol-4-sulfonic acid, 2-naphthol-6-sulfonic acid, 1-naphthol-4-carboxylic acid, and the like. Among these, preferred are 1-naphthol, 1,4-dihydroxynaphthalene, 1,2,3-trihydroxynaphthalene, 1,4,5,8-tetrahydroxynaphthalene, and 1-naphthol-4-sulfonic acid.

The hydroxynaphthalene compounds (A-1) as above may be used either singly or in combination of two or more.

(A-2) Aldehyde compound

The aldehyde compound (A-2) is an organic compound having at least one aldehyde group (—CHO group), preferably one or two aldehyde groups.

The aldehyde compound includes, for example, the compounds of the following general formulas (2) to (4):

wherein $R^2$ is a group selected from the group consisting of —H, —COOH, —CHO and substituted or unsubstituted alkyl groups of from 1 to 5 carbon atoms;

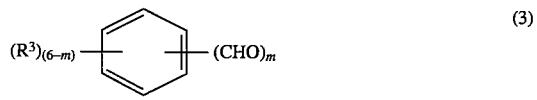

wherein $R^3$ group or groups, which may be the same or different from each other, are each a group selected from the group consisting of —H and —OH, and m is an integer from 1 to 6; and

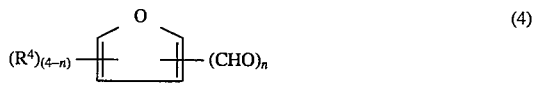

wherein $R^4$ is a hydrogen atom or an alkyl group of 1 to 5 carbon atoms, and, where plural $R^4$'s are present, they may be the same or different, and n is an integer from 1 to 4.

Specific examples of the compounds of the above general formula (2) include formaldehyde, acetaldehyde, glyoxylic acid, glyoxal, and the like.

Specific examples of the compounds of the above general formula (3) include benzaldehyde, salicylaldehyde, phthalaldehyde and the like.

Specific examples of the compounds of the above general formula (4) include furfural and the like.

Among the compounds of the general formulas (2) to (4), preferred are formaldehyde, glyoxylic acid, benzaldehyde, salicylaldehyde, and furfural.

The aldehyde compounds (A-2) as above may be used either singly or in combination of two or more.

Preparation of condensation product (A)

The above-described hydroxynaphthalene compound (A-1) and aldehyde compound (A-2) are condensed with each other, to give the condensation product (A). The condensation of the hydroxynaphthalene compound (A-1) with the aldehyde compound (A-2) may be conducted in water in the presence of a catalyst, normally at 50° to 150° C. for 1 to 20 hours, and preferably at 60° to 90° C. for 2 to 10 hours.

The catalyst includes, for example, acid catalysts such as phosphoric acid, sulfuric acid, hydrochloric acid and the like, and base-catalysts such as NaOH, KOH, LiOH, $NH_3$ and the like.

In preparing the condensation product (A), the hydroxynaphthalene compound (A-1) and aldehyde compound (A-2) are used in amounts which depend on the kinds of the component (A-1), component (A-2) and catalyst used, reaction temperature, reaction time and so forth. The component (A-2) is preferably used in an amount of from 0.1 to 10 moles, more preferably from 0.3 to 3 moles, per mole of the component (A-1). If the amount of the component (A-2) is too large or too small, the resulting condensation product (A) will give a lowered polymer scale preventive effect when formulated into a polymer scale preventive agent.

The amount of the catalyst to be used for the condensation reaction is not particularly limited, and is normally from 0.1 to 10 moles, preferably from 0.5 to 5 moles, per mole of the hydroxynaphthalene compound (A-1). (B) Inorganic colloid The inorganic colloid (B) is a particulate colloid produced by a dispersing method with water as dispersion medium or by a condensing method, the size of colloidal particles being from 1 to 500 mμ.

Specific examples of the inorganic colloid include colloids of metal oxides and hydroxides, the metal being selected from the group consisting of aluminum, thorium, titanium, zirconium, antimony, tin, iron and the like; colloids of tungstic acid, vanadium pentoxide, gold and silver; silver iodide sols; colloids of selenium, sulfur, silica and the like; and so on. Among these, preferred are colloids of a metal oxide or hydroxide, the metal being selected from the group consisting of aluminum, titanium, zirconium, tin and iron, and colloidal silica.

The inorganic colloids (B) as above may be used either singly or in combination of two or more.

Preparation of polymer scale preventive agent

The polymer scale preventive agent according to the present invention comprises an alkaline solution containing the above-described condensation product (A) and inorganic colloid (B). The polymer scale preventive agent is applied to inner wall surfaces of a polymerization vessel and the like, followed by drying to form a coating, whereby polymer scale can be prevented from being deposited on the polymerization vessel inner wall or the like.

The polymer scale preventive agent is prepared, for example, by adding an aqueous medium to the above-described condensation product (A) and inorganic colloid (B) followed by mixing, and controlling the pH of the resulting liquid mixture into an alkaline range.

Where the condensation product (A) for use in preparing the polymer scale preventive agent is produced by using a base catalyst, the condensation reaction mixture containing the condensation product (A) upon completion of the condensation reaction is alkaline and, hence, can be used directly for preparation of the polymer scale preventive agent. On the other hand, where the condensation product (A) is produced by using an acid catalyst, the condensation reaction mixture obtained is treated to remove the solvent therefrom, then the condensation product (A) is washed and is vacuum dried at low temperature, before being used for preparation of the polymer scale preventive agent.

As the aqueous medium for preparation of the polymer scale preventive agent, water may normally be used. Also usable as the aqueous medium are mixed solvents of water and an organic solvent miscible with water. The organic solvents miscible with water include, for example, alcohols such as methanol, ethanol, propanol and the like, ketones such as acetone, methyl ethyl ketone and the like, and esters such as methyl acetate and the like. Where such mixed solvent of water and an organic solvent miscible with water is used, the amount of the organic solvent in the mixed solvent is selected so that there will be little danger of inflammation, explosion or the like and no problems as to safety in handling, such as toxicity. Specifically, the amount of the organic solvent contained in the mixed solvent is preferably 50% by weight or less, and more preferably 30% by weight or less.

The polymer scale preventive agent has a pH in an alkaline range, preferably from 9 to 14, more preferably from 11 to 13. The alkaline compounds which can be used for the pH adjustment include, for example, NaOH, KOH, LiOH, $NH_3$ and the like.

The amount of the component (B) in the polymer scale preventive agent is normally from 0.1 to 1000 parts by weight, and preferably from 1 to 600 parts by weight, per 100 parts by weight of the component (A). If the amount of the component (B) relative to the amount of the component (A) is too large or too small, it may be impossible to obtain the polymer scale preventive effect.

Besides, for further improvement of the polymer scale preventive effect, it is preferable to add a water-soluble polymeric compound (C) to the polymer scale preventive agent.

(C) Water-soluble polymeric compound

The water-soluble polymeric compound (C) includes, for example, amphoteric polymeric compounds such as gelatin, casein, etc.; anionic polymeric compounds such as polyacrylic acid, polystyrenesulfonic acid, carboxymethyl cellulose, alginic acid, etc.; cationic nitrogen-containing polymeric compounds such as polyvinyl pyrrolidone, chitosan, polyacrylamide, etc.; hydroxyl group-containing polymeric compounds such as polyvinyl alcohol, hydroxyethyl cellulose, hydroxypropyl cellulose, pectin, etc.; and so forth.

Among the water-soluble polymeric compounds (C) as above, preferred are gelatin, casein, polyacrylic acid, carboxymethyl cellulose, polyvinyl pyrrolidone and pectin.

The water-soluble polymeric compounds (C) may be used either singly or in combination of two or more.

The amount of the component (C) is normally from 0.1 to 1000 parts by weight, and preferably from 1 to 300 parts by weight, per 100 parts by weight of the component (A).

The total concentration of the components (A) and (B) in the polymer scale preventive agent is not particularly limited, as long as the total coating weight described later can be obtained. The total concentration is normally from about 0.005% to about 10% by weight, and preferably from about 0.03% to about 2.0% by weight. Also, where the component (C) is added, the total concentration of the components (A), (B) and (C) is preferably from about 0.005% to about 10% by weight, more preferably from about 0.03% to about 2.0% by weight.

Formation of coating

To form a coating on inner wall surfaces of a polymerization vessel using the polymer scale preventive agent prepared as above-described, first the agent is applied to the inner wall surfaces of the polymerization vessel. Then, the applied agent is dried sufficiently at a temperature ranging, for example, from room temperature to 100° C., optionally followed by washing with water.

The polymer scale preventive agent is preferably applied to not only the inner wall surfaces of a polymerization vessel but also other areas with which the monomer comes into contact during polymerization, for example, stirring blades, stirring shaft, baffles, condensers, headers, search coil, bolts, nuts, etc.

More preferably, for formation of the coating, the polymer scale preventive agent is applied to areas with which the monomer does not come into contact during polymerization but on which polymer scale may be deposited, for example, the inner surfaces, etc. of equipment and pipes of an unreacted monomer recovery system. Specifically, such areas include the inner surfaces of monomer distillation columns, condensers, monomer stock tanks, valves, and so on.

The method of applying the polymer scale preventive agent to the inner wall surfaces of a polymerization vessel is not particularly restricted, and includes, for example, brush coating, spray coating, a method by filling the polymerization vessel with the polymer scale preventive agent followed by withdrawal thereof, and the automatic coating methods as disclosed in Japanese Pre-examination Patent Publication (KOKAI) Nos. 57-61001 (1982) and 55-36288 (1980), Japanese Patent Publication (KOHYO) Nos. 56-501116 (1981) and 56-501117 (1981), and Japanese Pre-examination Patent Publication (KOKAI) No. 59-11303 (1984), etc.

The method of drying wet coated surfaces provided by application of the polymer scale preventive agent, is not restricted, either. For example, the following methods can be used: a method in which, after the agent is applied, hot air with a suitable elevated temperature is blown to the coated surface; a method in which the inner wall surfaces of a polymerization vessel and the surfaces of other parts to be coated are preliminarily heated, for example, to a temperature of 30° to 80° C., and the polymer scale preventive agent is directly applied to the heated surfaces; and so on. After dried, the coated surfaces are washed with water if necessary.

The coating obtained in this manner has a total coating weight after dried of normally from 0.001 to 5 $g/m^2$, and preferably from 0.05 to 2 $g/m^2$.

The formed coating has good durability and retains the polymer scale-preventing action; therefore, the above-described coating operation may not necessarily be carried out every batch of polymerization. Accordingly, productivity is improved.

Polymerization

After the formation of the coating on the inner wall surfaces of a polymerization vessel, and preferably also on other areas with which monomer may come into contact during polymerization, etc. by the coating operation as above, polymerization is carried out in accordance with conventional procedures. That is, a monomer having an ethylenically unsaturated double bond, a polymerization initiator (catalyst), and optionally a polymerization medium such as water, etc., a dispersing agent such as suspending agents, solid dispersing agents, nonionic or anionic emulsifying agents, etc., and the like are charged into the polymerization vessel, and then polymerization is carried out according to conventional procedures.

The monomers having an ethylenically unsaturated double bond which can be polymerized by applying the process of the present invention include, for example, vinyl halides such as vinyl chloride and the like; vinyl esters such as vinyl acetate, vinyl propionate and the like; acrylic acid, methacrylic acid, and their esters and salts; maleic acid, fumaric acid, and their esters and anhydrides; diene monomers such as butadiene, chloroprene, isoprene and the like; styrene; acrylonitrile; vinylidene halides; vinyl ethers; and so forth. These monomers may be used singly or in combination of two or more.

There are no particular restrictions on the type of polymerization to which the process according to the present invention can be applied. That is, the process of the present invention is effective in any of such polymerization types as suspension polymerization, emulsion polymerization, solution polymerization, bulk polymerization, and gas phase polymerization. Particularly, the process of the present invention is more suitable to polymerizations in an aqueous medium, such as suspension polymerization and emulsion polymerization.

In the following, general procedures of polymerization are described with reference to each type of polymerization.

In suspension and emulsion polymerizations, first, water and a dispersing agent are charged into a polymerization vessel, and thereafter a polymerization initiator is charged. Subsequently, the polymerization vessel is evacuated to reduce the internal pressure to a value of 0.1 to 760 mmHg, and a monomer is then charged (whereupon the internal pressure usually takes a value of from 0.5 to 30 $kgf/cm^2.G$). Thereafter, polymerization is carried out at a reaction temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel has fallen to a value of 0 to 7 $kgf/cm^2.G$ or when cooling water which is let flow into and out of a jacket provided around the polymerization vessel has come to show approximately equal inlet and outlet temperatures (i.e., when liberation of heat due to polymerization reaction has subsided). The amounts of the water, dispersing agent and polymerization initiator to be charged for polymerization are 20 to 500 parts by weight, 0.01 to 30 parts by weight, and 0.01 to 5 parts by weight, respectively, per 100 parts by weight of the monomer.

In solution polymerization, an organic solvent such as toluene, xylene, pyridine, etc. is used as the polymerization medium, in place of water. A dispersing agent may be used, if necessary. The other conditions for polymerization are generally the same as those described for suspension and emulsion polymerizations.

In bulk polymerization, after a polymerization vessel is evacuated to a pressure of from about 0.01 mmHg to about 760 mmHg, a monomer and a polymerization initiator are charged into the polymerization vessel, and then polymerization is carried out at a reaction temperature of from −10° C. to 250° C. For example, the reaction temperature is 30° to 80° C. for polymerization of vinyl chloride, and is 50° to 150° C. for polymerization of styrene.

Where polymerization is carried out by applying the process for producing a polymer according to the present invention, it is possible to prevent polymer scale from being deposited, regardless of the materials of the inner wall, etc. of a polymerization vessel. For example, where the polymerization vessel is made of a stainless steel or other steel as well as where the polymerization vessel is a glass-lined one or the like, the polymer scale deposition can be prevented from occurring during polymerization.

Those additive materials which are conventionally added in polymerization systems can be used without any limitations. That is to say, the process of the present invention can effectively prevent polymer scale deposition in polymerization systems which may contain additive materials including, for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g. hydroxypropyl methyl cellulose), pyrogallol-acetone resin, etc.; solid dispersing agents such as calcium phosphate, hydroxyapatite, etc.; nonionic emulsifying agents such as sorbitan monolaurate, sorbitan trioleate, polyoxyethylene alkyl ether, etc.; anionic emulsifying agents such as sodium lauryl sulfate, sodium alkylbenzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; plasticizers such as DOP, DBP, etc.; chain transfer agents such as mercaptans (e.g. t-dodecyl mercaptan), trichloroethylene, etc.; pH adjusters, and so forth.

Besides, the polymer scale preventive agent of the present invention may be added to the medium for polymerization. In that case, for example, the polymer scale preventive agent is used in the coating operation and, moreover, a small amount of the agent is added to the medium for polymerization. Where such addition of the agent to the polymerization medium as well as the coating operation is carried out, the resulting scale preventive effect is higher than that attainable by the coating operation alone. In the case of adding the polymer scale preventive agent in the form of a solution to the medium for polymerization, the addition amount may be in the range from 5 to 1000 ppm based on the total weight of the monomer or monomers having an ethylenically unsaturated double bond which are charged into the polymerization vessel.

EXAMPLES

The present invention will now be described in detail below, referring to examples thereof and comparative examples. In each table below, experiments marked with * on their number (No.) are comparative examples and the other experiments are working examples of the present invention.

Preparation of Condensation Product No. 1

A 2-liter, three-necked separable flask equipped with a reflux condenser, thermometer and stirrer was charged with water (1 liter), 1,4,5,8-tetrahydroxynaphthalene (1 mole) as hydroxynaphthalene compound (A-1), formaldehyde (1.2 moles) as aldehyde compound (A-2), and phosphoric acid (1 mole) as catalyst. Subsequently, while the flask was heated on an oil bath at 85° C., the reaction mixture in the flask was reacted with stirring under a stream of nitrogen for 5 hours, followed by cooling. Then, after removal of the solvent from the cooled reaction mixture, the residue was washed and was vacuum dried at 50° C. Condensation Product No. 1 was thus obtained.

Preparation of Condensation Product Nos. 2 to 10

Condensation Product Nos. 2 to 10 were produced in the same manner as Condensation Product No. 1, except for using the component (A-1) (hydroxynaphthalene compound), component (A-2) (aldehyde compound), catalyst and solvent as shown in Table 1.

Also shown in Table 1 are the total concentration of (A-1)+(A-2)+catalyst, molar ratio of (A-1):(A-2) catalyst, reaction temperature, and reaction time.

Condensation Product No. 2 is the same as the condensation product described in Example 1 of the Japanese Patent Publication (KOKOKU) No. 01-31523 (1989).

TABLE 1

| (A) Condensation product No. | (A-1) Hydroxynaphthalene compound | (A-2) Aldehyde compound | Catalyst Acid | Catalyst Base | Solvent | Total con. of (A-1) + (A-2) + Catalyst (mol/l) | (A-1): (A-2): Catalyst (mol. ratio) | Reaction temp. (°C.) | Reaction time (hr) |
|---|---|---|---|---|---|---|---|---|---|
| 1 | 1,4,5,8-Tetrahydroxynaphthalene | Formaldehyde | Phosphoric acid | — | Water | 2.9 | 1:1:2:1 | 85 | 5 |
| 2 | 1-Naphthol | Formaldehyde | — | NaOH | Water | 3.8 | 1:1:0.72 | 70 | 4.5 |
| 3 | 1,2,3-Trihydroxynaphthalene | Formaldehyde | Phosphoric acid | — | Water | 3.0 | 1:0.9:1 | 95 | 6 |
| 4 | 1,4-Dihydroxynaphthalene | Formaldehyde | Phosphoric acid | — | Water | 3.0 | 1:1:1.2 | 95 | 6 |
| 5 | 1,4,5,8-Tetrahydroxynaphthalene | Benzaldehyde | Phosphoric acid | — | Water | 3.0 | 1:1:1.3 | 95 | 6 |
| 6 | 1,4,5,8-Tetrahydroxynaphthalene | Furfural | Phosphoric acid | — | Water | 3.0 | 1:1:1.5 | 95 | 6 |
| 7 | 1,4,5,8-Tetrahydroxynaphthalene | Glyoxylic acid | Phosphoric acid | — | Water | 3.0 | 1:1:1.2 | 95 | 8 |
| 8 | 1,4,5,8-Tetrahydroxynaphthalene | Salicylaldehyde | Phosphoric acid | — | Water | 3.0 | 1:1:1.1 | 95 | 9 |
| 9 | 1-Naphthol-4-sulfonic acid | Furfural | Sulfuric acid | — | Water | 3.0 | 1:0.8:1.2 | 95 | 10 |
| 10 | 1,2,3-Trihydroxynaphthalene | Glyoxylic acid | Hydrochloric acid | — | Water | 3.0 | 1:0.8:1 | 95 | 6 |

Example 1 (Experiment Nos. 101–114)

A stainless steel polymerization vessel having an internal capacity of 2000 liters and equipped with a stirrer was used in each of these experiments.

In each experiment, a polymer scale preventive agent was prepared by using the condensation product (A), inorganic colloid (B), water-soluble polymeric compound (C), solvent and alkaline compound as given in Table 2 in such amounts as to satisfy the conditions (total concentration of (A)+(B)+

(C), weight ratio of (A):(B): (C), solvent composition, and pH) as given in Table 2. The inorganic colloids (a to g, in Table 2 and Table 5) which were used in this Example 1 and in Example 2 (which will be described below) are as set forth in Table 4. The polymer scale preventive agents thus prepared were each applied to the inner wall of the polymerization vessel and to the areas with which monomer comes into contact during polymerization, such as the stirring blades, stirring shaft, etc., and dried by heating at 50° C. for 15 minutes to form a coating, followed by washing the inside of the polymerization vessel with water.

Thereafter, in each experiment, polymerization was carried out as follows. The polymerization vessel having the coating formed by the above coating treatment was charged with 800 kg of water, 400 kg of vinyl chloride, 500 g of a partially saponified polyvinyl alcohol, 50 g of hydroxypropyl methyl cellulose and 140 g of 3,5,5-trimethylhexanoyl peroxide, and polymerization was carried out with stirring at 66° C. for 6 hours. After the polymerization was over, the produced polymer and unreacted monomer were recovered, the inside of the polymerization vessel was washed with water, and residual resin was removed.

A batch of operations from the formation of the coating through polymerization to washing the inside of the polymerization vessel with water as described above was repeated, the number of repeated batches being given in Table 3.

In each experiment, after the final batch was over, the amount of polymer scale deposited on the areas located in the liquid-phase region in the polymerization vessel and the amount of polymer scale deposited on the areas around the interface between the gas and liquid phases in the polymerization vessel were determined according to the method as follows. The results are given in Table 3.

Measurement of the amount of polymer scale deposited

The scale deposited in an area of 10 cm square at a predetermined location on the inner wall of a polymerization vessel is scraped off with a stainless steel spatula as completely as can be confirmed with the naked eye, and then the scraped scale is weighed on a balance. The measured value is multiplied by 100 to obtain the amount of the deposited polymer scale per area of 1 $m^2$.

Besides, the number of fish eyes which may appear when a polymer is formed into sheet was measured with respect to the polymers produced in the experiments, according to the method below. The results are given in Table 3.

Measurement of fish eyes

A hundred (100) parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The obtained sheet is examined for the number of fish eyes per 100 $cm^2$ by light transmission.

Further, to evaluate initial coloration property at the time a polymer is formed into sheet, luminosity index (L value) was measured with respect to the polymers produced in the experiments, according to the method below. The results are given in Table 3.

Measurement of luminosity index (L value)

A hundred (100) parts by weight of a polymer, 1 part by weight of a tin laurate stabilizing agent (TS-101, product of Akisima Chemical Co.) and 0.5 part by weight of a cadmium stabilizing agent (C-100J, product of Katsuta Kako Co.), and 50 parts by weight of dioctyl phthalate as a plasticizer are kneaded at 160° C. for 5 minutes with a twin roll mill, and then formed into a sheet 1 mm thick. Subsequently, this sheet is placed in a mold measuring 4×4×1.5 cm, heated at 160° C. under a pressure of 65 to 70 kgf/$cm^2$ for 0.2 hour and press molded under the same conditions to prepare a test specimen. This test specimen is measured for luminosity index L in the Hunter's color difference equation described in JIS Z 8730 (1980). The greater the value of L, the higher the whiteness evaluated, namely, the better the initial coloration property evaluated.

The value of L is determined as follows.

The stimulus value Y of XYZ color system is determined by the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 is adopted. From the stimulus value Y obtained, the L value is calculated based on the equation: $L=10Y^{1/2}$ described in JIS Z 8730 (1980).

TABLE 2

| Exp. No. | (A) Condensation product No. | (B) Inorganic colloid | (C) Water-soluble polymeric compound | Total conc. of (A) + (B) + (C) (wt. %) | (A):(B):(C) (wt. ratio) | Solvent (weight ratio) | Alkaline compound | pH |
|---|---|---|---|---|---|---|---|---|
| 101* | 2 | — | — | 0.3 | — | Water:Methanol (90:10) | NaOH | 12.5 |
| 102 | 2 | b | — | 0.3 | 100:100:— | Water:Methanol (90:10) | NaOH | 12.5 |
| 103* | 2 | — | Gelatin | 0.3 | 100:—:100 | Water:Methanol (90:10) | NaOH | 12.5 |
| 104 | 2 | b | Gelatin | 0.3 | 100:100:100 | Water:Methanol (90:10) | NaOH | 12.5 |
| 105* | 1 | — | Polyvinyl alcohol | 0.3 | 100:—:100 | Water:Methanol (90:10) | NaOH | 12.5 |
| 106 | 1 | a | Polyvinyl alcohol | 0.3 | 100:100:100 | Water:Methanol (90:10) | NaOH | 12.5 |
| 107 | 3 | c | Casein | 0.3 | 100:300:100 | Water:Acetone (70:30) | NaOH | 12.5 |
| 108 | 4 | d | Polyacrylic acid | 0.3 | 100:300: 50 | Water:Methanol (80:20) | KOH | 12.5 |
| 109 | 5 | e | Na salt of carboxymethyl cellulose | 0.2 | 100:150:100 | Water:Methanol (80:20) | KOH | 12.5 |
| 110 | 6 | f | Polyvinyl pyrrolidone | 0.2 | 100:150: 30 | Water:Methanol (80:20) | KOH | 12.5 |
| 111 | 7 | g | Pectin | 0.2 | 100:300: 10 | Water:Methanol (90:10) | KOH | 12.5 |
| 112 | 8 | b | Polyvinyl pyrrolidone | 0.3 | 100: 50:100 | Water:Acetone (90:10) | KOH | 12.5 |
| 113 | 9 | a | Polyvinyl pyrrolidone | 0.3 | 100: 50:200 | Water:Methanol (90:10) | KOH | 12.5 |
| 114 | 10 | d | Polyvinyl pyrrolidone | 0.3 | 100:100: 50 | Water:Methanol (90:10) | KOH | 12.5 |

TABLE 3

| | | Results of polymerization | | | |
|---|---|---|---|---|---|
| Exp. No. | Number of repeated batches | Polymer scale amount (g/m²) Liquid phase | Polymer scale amount (g/m²) Around interface of gas and liquid phases | Number of fish eyes | Luminosity index (L value) |
| 101* | 10 | 8 | 450 | 60 | 72.5 |
| 102 | 60 | 5 | 120 | 53 | 72.5 |
| 103* | 15 | 6 | 200 | 55 | 72.0 |
| 104 | 100 | 0 | 7 | 12 | 72.0 |
| 105* | 15 | 6 | 180 | 54 | 72.5 |
| 106 | 100 | 0 | 9 | 11 | 72.5 |
| 107 | 80 | 0 | 6 | 13 | 72.0 |
| 108 | 80 | 0 | 6 | 15 | 72.5 |
| 109 | 80 | 0 | 7 | 12 | 72.0 |
| 110 | 80 | 0 | 6 | 10 | 72.0 |
| 111 | 80 | 0 | 8 | 10 | 72.0 |
| 112 | 100 | 0 | 10 | 8 | 72.0 |
| 113 | 100 | 0 | 10 | 8 | 72.0 |
| 114 | 80 | 0 | 9 | 13 | 72.0 |

TABLE 4

| | Diameter of colloidal particles (mμ) | Name of article | Manufacturer |
|---|---|---|---|
| a | 10–20 | Snowtex O (colloidal silica) | Nissan Chemical Industries, Ltd. |
| b | 5–7 | Snowtex CXS-9 (colloidal silica) | Nissan Chemical Industries, Ltd. |
| c | 100–200 | Titanium oxide | Nissan Chemical Industries, Ltd. |
| d | 10–20 | Aluminum oxide | Nissan Chemical Industries, Ltd. |
| e | 60–70 | Zirconium oxide | Nissan Chemical Industries, Ltd. |
| f | 20–50 | Tin oxide | Nissan Chemical Industries, Ltd. |
| g | 10–15 | Iron hydroxide | produced by the present inventors |

Example 2 (Experiment Nos. 201–207)

A stainless steel polymerization vessel having an inner capacity of 20 liters and equipped with a stirrer was used in each of these experiments.

In each experiment, a polymer scale preventive agent was prepared by using the condensation product (A), inorganic colloid (B), water-soluble polymeric compound (C), solvent, and alkaline compound as given in Table 5 in such amounts as to satisfy the conditions (total concentration of (A)+(B)+(C), weight ratio of (A):(B): (C), solvent composition, and pH) as given in Table 5. The polymer scale preventive agents were each applied to the inner wall, the stirring shaft, the stirring blades and other areas with which a monomer comes into contact of the polymerization vessel, and dried by heating at 50° C. for 15 minutes to form a coating, followed by washing the inside of the polymerization vessel with water.

Subsequently, in each experiment, the polymerization vessel provided with the coating by the coating treatment as above was charged with 9 kg of water, 225 g of sodium dodecylbenzenesulfonate, 12 g of t-dodecyl mercaptan and 13 g of potassium peroxodisulfate. After the inside atmosphere of the polymerization vessel was replaced with nitrogen gas, 1.3 kg of styrene and 3.8 kg of butadiene were charged into the vessel, and polymerization was carried out at 50° C. for 20 hours. After the polymerization was over, the produced polymer and unreacted monomer were recovered out of the polymerization vessel, the inside of which was then washed with water and residual resin was removed.

A batch of operations from the formation of the coating through polymerization to washing the inside of the polymerization vessel with water as described above was repeated, the number of repeated batches being given in Table 6.

After the final batch was over, in each experiment, the amount of polymer scale deposited on the areas in the liquid-phase region in the polymerization vessel and the amount of polymer scale deposited on the areas around the interface between the gas and liquid phases were measured according to the same method as in Example 1. The results are given in Table 6.

Besides, to evaluate initial coloration property at the time a polymer is formed into sheet, luminosity index (L value) was measured with respect to the polymers produced in the experiments, according to the method below. The results are given in Table 6.

Measurement of luminosity index (L value)

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin.

The resin was placed in a mold measuring 9×9×0.1 cm (depth), heated at 195° C. under a pressure of 50 to 60 kgf/cm² and press molded under a final pressure of 80 kgf/cm² to prepare a test specimen. This test specimen was measured for luminosity index L in the same manner as in Example 1.

TABLE 5

| | Polymer scale Preventive agent | | | | | | | |
|---|---|---|---|---|---|---|---|---|
| Exp. No. | (A) Condensation product No. | (B) Inorganic colloid | (C) Water-soluble polymeric compound | Total conc. of (A) + (B) + (C) (wt. %) | (A):(B):(C) (wt. ratio) | Solvent (weight ratio) | Alkaline compound | pH |
| 201* | 2 | — | — | 0.3 | — | Water:Methanol (70:30) | NaOH | 12.5 |
| 202 | 2 | b | — | 0.3 | 100:200:— | Water:Methanol (70:30) | NaOH | 12.5 |
| 203* | 2 | — | Polyvinyl pyrrolidone | 0.3 | 100:—:100 | Water:Methanol (70:30) | NaOH | 12.5 |
| 204 | 2 | b | Polyvinyl pyrrolidone | 0.3 | 100:200:100 | Water:Methanol (70:30) | NaOH | 12.5 |
| 205 | 1 | a | Polyacrylic acid | 0.3 | 100:300: 50 | Water:Acetone (80:20) | NaOH | 12.5 |
| 206 | 3 | c | Casein | 0.2 | 100:150: 50 | Water:Methanol (80:20) | NaOH | 12.5 |
| 207 | 5 | d | Gelatin | 0.2 | 100:300:100 | Water:Methanol (70:30) | NaOH | 12.5 |

TABLE 6

| Exp. No. | Number of repeated batches | Results of polymerization | | Luminosity index (L value) |
|---|---|---|---|---|
| | | Polymer scale amount (g/m²) | | |
| | | Liquid phase | Around interface of gas and liquid phases | |
| 201* | 5 | 12 | 350 | 84.0 |
| 202 | 20 | 8 | 280 | 84.0 |
| 203* | 7 | 9 | 300 | 83.5 |
| 204 | 30 | 0 | 15 | 83.5 |
| 205 | 30 | 0 | 20 | 84.0 |
| 206 | 26 | 0 | 33 | 83.5 |
| 207 | 28 | 0 | 28 | 83.5 |

We claim:

1. A process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline solution of pH from 9 to 14 of:

(A) a condensation product consisting of
(A-1) a hydroxynaphthalene compound (1): having the following general formula

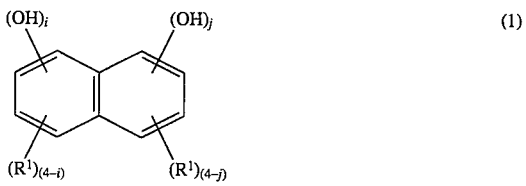

wherein $R^1$ group or groups, which may be the same or different from each other, are each a member selected from the group consisting of —H, —SO$_3$H and —COOH, i is an integer from 1 to 4, and j is an integer from 0 to 4, and (A-2) at least one aldehyde compound selected from the group consisting of the compounds of the following general formulas (2) and (4):

wherein $R^2$ is —H, —COOH, —CHO or an alkyl group of from 1 to 5 carbon atoms;

wherein $R^3$ group or groups, which may be the same or different from each other, are each a member selected from the group selected from the group consisting of —H and —OH, and m is an integer from 1 to 6; and

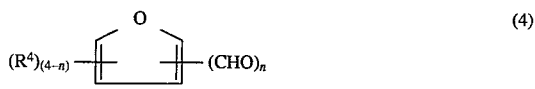

wherein $R^4$ is a hydrogen atom or an alkyl group of 1 to 5 carbon atoms, and, where plural $R^4$'s are present, they may be the same or different, and n is an integer from 1 to 4, (B) an inorganic colloid of silica, an oxide, a hydroxide or a mixture of two or three thereof, said oxide and hydroxide being those of a metal selected from the group consisting of aluminum, titanium, zirconium, tin and iron, and (C) a water-soluble polymeric compound selected from the group consisting of gelatin, casein, polyacrylic acid, carboxymethyl cellulose, polyvinyl pyrrolidine and pectin, in a mixed solvent containing water and a organic solvent miscible with water, said organic solvent being present in an amount of not more than 50% by weight based on said mixed solvent, followed by drying.

2. The process of claim 1, wherein said polymerization is conducted as suspension polymerization, emulsion polymerization, solution polymerization, bulk polymerization, or gas phase polymerization.

3. The process of claim 1, wherein said monomer comprises at least one compound selected from the group consisting of vinyl halides; vinyl esters; acrylic acid, methacrylic acid, and their esters and salts; maleic acid, fumaric acid, and their esters and anhydrides; diene monomers; styrene; acrylonitrile; vinylidene halides; and vinyl ethers.

4. The process of claim 1, wherein the component (A-1) comprises at least one compound selected from the group consisting of 1-naphthol, 1,4-dihydroxynaphthalene, 1,2,3-trihydroxynaphthalene, 1,4,5,8-tetrahydroxynaphthalene and 1-naphthol-4-sulfonic acid.

5. The process of claim 1, wherein the component (A-2) comprises at least one compound selected from the group consisting of formaldehyde, glyoxylic acid, benzaldehyde, salicylaldehyde and furfural.

6. The process of claim 1, wherein the condensation product (A) is obtained by condensing the component (A-1) with the component (A-2), the amount of the component (A-2) being from 0.1 to 10 moles per 1 mole of the component (A-1).

7. The process of claim 1, wherein the component (B) is present in an amount of from 0.1 to 1000 parts by weight per 100 parts by weight of the component (A).

8. The process of claim 1, wherein the total concentration of the components (A) and (B) in the alkaline solution is from 0.005 to 10% by weight.

* * * * *